(No Model.)

G. W. GEISSENHAINER.
FIRE PLACE BLOWER.

No. 332,072.  Patented Dec. 8, 1885.

Witnesses.
L. F. Gardner
L. L. Burket,

Inventor.
G. W. Geissenhainer,
per F. A. Lehmann,
Atty.

United States Patent Office.

GEORGE W. GEISSENHAINER, OF PITTSBURG, PENNSYLVANIA.

FIRE-PLACE BLOWER.

SPECIFICATION forming part of Letters Patent No. 332,072, dated December 8, 1885.

Application filed April 9, 1885. Serial No. 161,727. (No model.)

*To all whom it may concern:*

Be it known that I, GEORGE W. GEISSENHAINER, a citizen of the United States, residing at Pittsburg, in the county of Allegheny and State of Pennsylvania, have invented certain new and useful Improvements in Blowers, Shutters, and Screens for Stoves and Fire-Places, of which the following is a specification, reference being had to the accompanying drawings.

My invention relates to an improvement in blowers, shutters, and screens for stoves and fire-places; and it consists in a construction by which they are made self-supporting in any position they may be placed by their own gravity.

Blowers, shutters, and screens for either fire-places or stoves, as heretofore known, are when in their places either balanced by weights or upheld by hinges, and when only temporarily applied they are placed and again removed when no longer needed.

My invention differs from the foregoing in this, that I neither use weights nor hinges to uphold the blowers, shutters, or screens in a desired position, but effect the same by their own gravity.

The accompanying drawings represent my invention.

Figure 1:
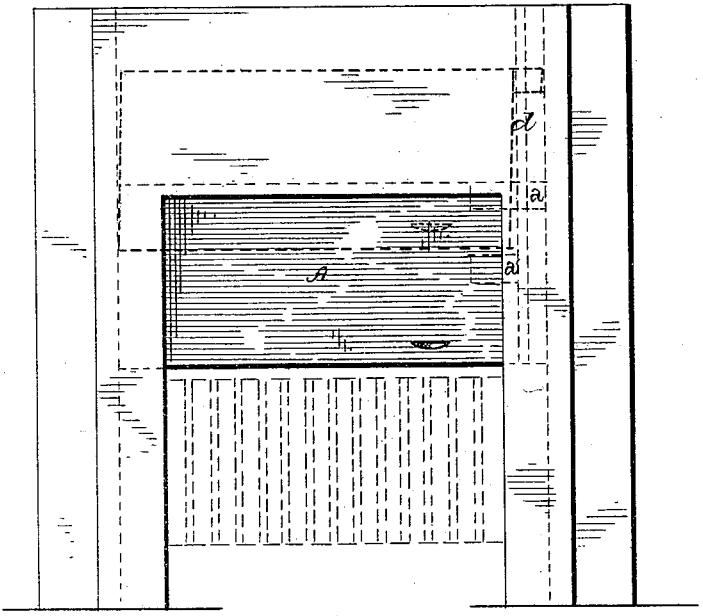
Figure 2:
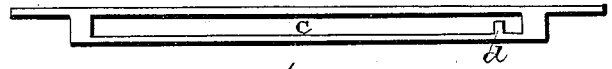
Figure 3:
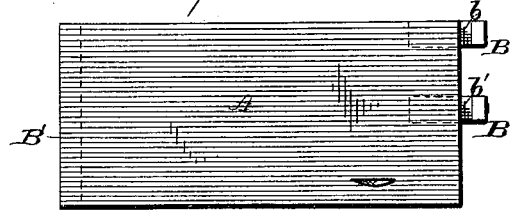
Figure 4:
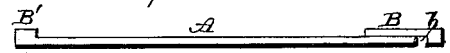

Figure 1 is a front elevation of a fire-place frame to which my blower is applied. Fig. 2 is a plan view of the frame in which the blower moves. Figs. 3 and 4 are detail views of the blower.

A represents a blower that is to be inserted in the groove C behind the front pieces of the fire-place or stove. When lowered to its full extent, the blower closes the front of the fire-place or stove from the grate upward, and when entirely raised up disappears from view. The blower has a vertical strip, B', secured to or formed down one end, for the purpose of making the blower thick enough at this point to fill the groove, and thus cause the blower to move vertically and without any lateral motion. At the opposite end of the blower are secured the two projecting flanges B, which have the grooves $b\ b'$ made in their front sides so as to catch over the ridge or strip $d$ formed inside of the groove or opening C in the fire-place. In the present instance there is a flange or rib made on the front side of the end of each flange, and this rib on one side and the end of the blower on the other form the groove for the rib $d$ to catch in. The flanges B are secured to the blower above its center, so that the opposite end of the blower will be freer to drop down than it would if the flanges were formed upon opposite sides of the blower. The object of these flanges B is to catch over opposite sides of the rib $d$, and hold the blower in any desired place by frictional contact alone.

If the blower be raised by applying the power in the center to balance it, there will be no obstacle in lowering it so long as the balance is maintained; but if the lifting-power be shifted toward the projections or flanges B the preponderating weight of the unsupported side causes that side to bear down and slightly change the position of the sides from vertical to an incline.

By inclining the sides the projections or flanges B are pressed against the intervening strip from opposite sides, clamp it, and prevent the blower from descending. The recesses or grooves in the flanges B are thus made to act in the same manner as the projections, and consequently the moment the lifting-power ceases the blower is upheld in the position it may at the time be, until by balancing its weight it is released from the clamping device.

The height of the blower is of no consequence, and may be increased or diminished to suit the occasion.

Having thus described my invention, I claim—

In a blower for fire-places, the combination of the frame provided with a recess on its inner side, and a strip within said recess, with the blower provided with clamping-lugs to catch upon the strip, substantially as shown.

In testimony whereof I affix my signature in presence of two witnesses.

GEORGE W. GEISSENHAINER.

Witnesses:
 LOUIS MOESER,
 IG. STAUFFER.